United States Patent
Andrassy et al.

(10) Patent No.: US 11,144,728 B2
(45) Date of Patent: Oct. 12, 2021

(54) NEURAL RELATION EXTRACTION WITHIN AND ACROSS SENTENCE BOUNDARIES

(71) Applicant: Siemens Aktiengesellschaft, Munich (DE)

(72) Inventors: Bernt Andrassy, Munich (DE); Pankaj Gupta, Munich (DE); Subburam Rajaram, Munich (DE); Thomas Runkler, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 128 days.

(21) Appl. No.: 16/517,161

(22) Filed: Jul. 19, 2019

(65) Prior Publication Data

US 2021/0019370 A1    Jan. 21, 2021

(51) Int. Cl.
 *G06F 40/30* (2020.01)
 *G06F 16/901* (2019.01)
 (Continued)

(52) U.S. Cl.
 CPC .......... *G06F 40/30* (2020.01); *G06F 16/9027* (2019.01); *G06F 40/205* (2020.01);
 (Continued)

(58) Field of Classification Search
 CPC .... G06F 40/30; G06F 16/9027; G06F 40/205; G06F 40/279; G06K 9/6215; G06K 9/6267; G06N 3/04; G06N 3/084; G06N 3/02
 (Continued)

(56) References Cited

U.S. PATENT DOCUMENTS

| 2017/0351749 A1 | 12/2017 | Quirk et al. |
| 2018/0232443 A1* | 8/2018 | Delgo .................... G06F 16/35 |
| 2020/0159831 A1* | 5/2020 | Mutalikdesai .......... G06F 40/30 |

OTHER PUBLICATIONS

International Search Report and Written Opinion in corresponding PCT Patent Application No. PCT/EP2020/067835 dated Oct. 15, 2020. 16 pages.

(Continued)

*Primary Examiner* — Charlotte M Baker
(74) *Attorney, Agent, or Firm* — Schmeiser, Olsen & Watts LLP

(57) ABSTRACT

Provided is a computer-implemented method for inter-sententially determining a semantic relationship between a first entity and a second entity in a natural language document, comprising at least the steps of:
 generating a first dependency parse tree, DPT, for a first origin sentence of the document which comprises the first entity, wherein each DPT comprises at least a root node;
 generating a second DPT for a second origin sentence of the document which mentions the second entity;
 linking the root nodes of the first DPT and the second DPT so as to create a chain of words, COW;
 determining for each word in the COW a subtree;
 generating for each word in the COW a subtree embedding vector $c_w$ which is based at least on word embedding vectors $x_w$ of the words of the subtree;
 generating a representation vector $p_w$ for each word in the COW; and
 classifying, using a recurrent neural network, the semantic relationship between the first entity and the second entity, based on the input representation vectors pw.

15 Claims, 4 Drawing Sheets

(51) Int. Cl.
  G06F 40/205 (2020.01)
  G06K 9/62 (2006.01)
  G06N 3/04 (2006.01)
  G06N 3/08 (2006.01)
(52) U.S. Cl.
  CPC ......... *G06K 9/6215* (2013.01); *G06K 9/6267* (2013.01); *G06N 3/04* (2013.01); *G06N 3/084* (2013.01)
(58) Field of Classification Search
  USPC .......................................................... 704/9
  See application file for complete search history.

(56) References Cited

OTHER PUBLICATIONS

Gupta, Pankaj et al., "Nerual Relation Extraction Within and Across Sentence Boundaries," arxiv.org, Cornell University Library, XP081064578, 2018. 11 pages.

Pennington et al., "Global vectors for word representation", Proceedings of the 2014 conference on empirical methods in natural language processing, EMNLP, 1532-1543, 2014; 2014.

Bi-directional recurrent neural network with ranking loss for spoken language understanding, in Proceedings of the Acoustics, Speech and Signal Processing (ICASSP), 6060-6064, Shanghai, China: IEEE, 2016; 2016.

Hagberg et al., Exploring network structure, dynamics, and function using networkx, Technical report, Los Alamos National Laboratory. A Fast and Accurate Dependency Parser Using Neural Networks, Proceedings of EMNLP 2014; 2014.

Liu et al., "A Dependency-Based Neural Network for Relation Classification", Proceedings of the 53rd Annual Meeting of the Association for Computational Linguistics and the 7th International Joint Conference on Natural Language Processing (Short Papers), pp. 285-290, Beijing, China, Jul. 26-31, 2015; 2015.

Table filling multi-task recurrent neural network for joint entity and relation extraction, 2016, Proceedings of COLING 2016, the 26th International Conference on Computational Linguistics: Technical Papers, 2537-2547; 2016.

https://universaldependencies.org/.

Finkel et al., "Incorporating non-local information into information extraction systems by gibbs sampling", Proceedings of the 48th Annual Meeting of the Association for Computational Linguistics, 363-370, Association for Computational Linguistics, 2005; 2005.

A Shortest Path Dependency Kernel for Relation, extraction, Proceedings of the Human Language Technology Conference and Conference on Empirical Methods in Natural Lanauge Processing, Vancouver, B.C., pp. 724-731, Oct. 2005; 2005.

Moen et al., "Distributional semantics resources for biomedical text processing", 2013; 2013.

\* cited by examiner

NEURAL RELATION EXTRACTION WITHIN AND ACROSS SENTENCE BOUNDARIES

FIELD OF TECHNOLOGY

Relation extraction is an important task in automated document processing. The task of relation extraction (RE) aims to identify semantic relations between a pair of entities (or: "nominals") e1 and e2 in a given sentence S. The semantic relationships may be identified out of a provided list of predefined relation classes, for example: content-container, cause-effect, instrument-agency but also "works for", "is related by blood to" and so on. Relation extraction is usually defined as a combination of entity recognition and relation classification but may also refer to the classification of a relation between two given entities.

BACKGROUND

Due to a rapid growth in information, relation extraction plays a vital role in knowledge extraction from unstructured texts and serves as an intermediate step in a variety of natural language processing (NLP) applications for example in newswire, web and high-valued biomedicine domains. Consequently, there has been increasing interest in relation extraction, particularly for augmenting existing knowledge bases.

Particular difficulties arise when it is desired to know a relation between an entity pair which are not comprised in one and the same sentence.

Past work in relation extraction mostly focuses on binary relations between entity pairs within single sentences (intra-sentential relationships), for example, Gupta et al., "Table filling multi-task recurrent neural network for joint entity and relation extraction", 2016, Proceedings of COLING 2016, the 26th International Conference on Computational Linguistics: Technical Papers, 2537-2547.

Other works focus on high-performance artificial neural networks for natural language processing, NLP. For example, Vu et al, "Bi-directional recurrent neural network with ranking loss for spoken language understanding", in "Proceedings of the Acoustics, Speech and Signal Processing (ICASSP), 6060-6064, Shanghai, China: IEEE, 2016 (hereafter cited as "Vu et al."), describes a so-called connectionist bi-directional recurrent neural network which combines the forward and backward pass by adding their hidden layers at each time step and also adds a weighted connection to the previous combined hidden layer to include all intermediate hidden layers into the final decision.

In Chen et al., "A Fast and Accurate Dependency Parser Using Neural Networks", Proceedings of EMNLP 2014 (hereafter cited as "Chen et al."), a transition-based parser is described which produces typed dependency parses of natural language sentences. The results of the dependency parsing can then be arranged in the form of dependency parse trees, DPT, for example by using NetworkX, see Hagberg et al., Exploring network structure, dynamics, and function using networkx, Technical report, Los Alamos National Laboratory (hereafter cited as "Hagberg et al.").

In Bunescu et al., "A Shortest Path Dependency Kernel for Relation extraction", Proceedings of the Human Language Technology Conference and Conference on Empirical Methods in Natural Language Processing, Vancouver, B.C., pages 724-731, October 2005 (hereafter cited as "Bunescu et al."), it is described how shortest paths between two entities within a sentence may capture essential information about their relationship.

Relationships or dependencies between words can be expressed for example using "Universal Dependencies", or UD, which is a framework for cross-linguistically consistent grammatical annotation in currently over 70 languages. Whenever herein UD symbols are used, the version 2 of the UD, currently available under the URL https://universaldependencies.org/, is referred to, although future versions of UD, or other similar frameworks, may be similarly applied.

Based thereon, the use of dependency trees (or: dependency parse trees) for relation classification is described, for example, in Liu et al., "A Dependency-Based Neural Network for Relation Classification", Proceedings of the 53rd Annual Meeting of the Association for Computational Linguistics and the 7th International Joint Conference on Natural Language Processing (Short Papers), pages 285-290, Beijing, China, Jul. 26-31, 2015 (hereafter cited as "Liu et al."). In Liu et al., so-called Dependency-based Neural Network, or DepNN, are introduced. DepNNs are used for modelling augmented dependency paths, ADP.

ADPs comprise shortest dependency paths between two entities within the same sentence, wherein each word of this shortest dependency path (as in Bunescu et al.) is augmented by its attached dependency subtree (if there is one).

Entity pairs spanning multiple sentences (inter-sentential relationships) are ignored in the approaches described above. Evidently, this can result in a lot of information in a document being lost when relation extraction is performed.

SUMMARY

Accordingly, it is one of the objectives of the present embodiments of the invention to provide a method and system for inter-sententially determining semantic relationships between entities in natural language documents.

Accordingly, a computer-implemented method for inter-sententially determining a semantic relationship between a first entity and a second entity in a natural language document is provided, the method comprising at least the steps of:

generating a first dependency parse tree, DPT, for a first origin sentence of the document which comprises the first entity, wherein each DPT comprises at least a root node;

generating a second DPT for a second origin sentence of the document which mentions the second entity;

linking the root nodes of the first DPT and the second DPT so as to create a chain of words, COW, from the first entity to the second entity;

determining for each word in the COW a subtree comprising the word itself as well as, if applicable, all words depending as nodes from said words as a root;

generating for each word in the COW a subtree embedding vector which, in case the word in the COW has a subtree, is based at least on word embedding vectors of the words of the subtree;

generating a representation vector for each word in the COW, wherein the representation vector for each word comprises a word embedding vector for said word itself as well as its subtree embedding vector;

inputting the representation vectors for each word in the chain of words into a recurrent neural network; and classifying, using the recurrent neural network, the semantic relationship between the first entity and the second entity, based on the input representation vectors.

The term "origin sentence" is used to differentiate the specific first and second origin sentences, which may be selected as part of the method, from other sentences. In the terms "first origin sentence" and "second origin sentence", the words "first" and "second" refer to the "first entity" and the "second entity", respectively, and not to a particular order of appearance or priority. Thus, the first origin sentence may appear later in the natural language document than the second origin sentence, or vice versa.

The dependency parse trees, DPT, may be generated by parsing sentences as described e.g. in Chen et al. and then by arranging the parsed sentences in DPTs by using e.g. NetworkX (see Hagberg et al.). Each token (word) is realized as a node of the tree, and the dependency relation is realized as a link between the nodes. Nodes that do not have any dependent nodes are sometimes also designated as "leaf nodes". The root node is dependent from no other node. If a word does not have a subtree (or, expressed in another way, if the word is identical to its subtree, i.e. a subtree of one single word), then said word is both a root node and a leaf node.

The linking of the root nodes may in particular be performed by connecting the roots by NEXTS. NEXTS is a weight or learnable parameter that connects roots of two trees.

The chain of words, COW, may also be designated as the shortest dependency path, SDP, as it is the shortest connection between the two entities along a dependency parse tree, DPT.

The subtree embedding vectors may indicate the semantic relationships expressed by, or in, each subtree. The word embedding vectors may indicate the semantic proximity of each word to any or all of a list of other words.

A recurrent (artificial) neural network comprises, for example, a network of neural units (or "nodes" or "neurons") which are connected by a directional connection or by a forward and a backward connection. As such, an activation or signal can propagate in both directions between two connected neurons of the recurrent neural network. Weights and biases of the neural network are adjusted during training of the neural network in order to improve the performance of the network ("learning").

In some advantageous embodiments, variants, or refinements of embodiments, the root nodes of the DPT of the first origin sentence and of the DPT of the second origin sentence are linked directly, preferably via NEXTS.

In some advantageous embodiments, variants, or refinements of embodiments, the method comprises selecting the first origin sentence and the second origin sentence from the sentences in the document such that the distance in sentences or the distance in words between the first sentence and the second sentence in the document is the smallest out of any pair of sentences of the document which comprise the first entity and the second entity, respectively. This follows the notion that the contents of the first and second origin sentences will be the closer referring to one another when they appear closer together within the natural language document and that therefore the performance of the method will increase.

In some advantageous embodiments, variants, or refinements of embodiments, the method comprises selecting the first origin sentence and the second origin sentence from the sentences in the document such that the distance in sentences or the distance in words between the first origin sentence and the second origin sentence within the COW is the smallest out of any pair of sentences of the document which comprise the first entity and the second entity, respectively. In this variant, a plurality of first and second DPTs may be produced for each of a plurality of candidate first and second origin sentences, the linking may be performed, and the size of the chain of words (i.e. of the shortest dependency path) may be calculated in order to then choose the final first and second origin sentences.

In some advantageous embodiments, variants, or refinements of embodiments, generating the subtree embedding vector for any word of the COW comprises, for each word of its subtree, recurrently applying a recursive or recurring neural network to generate a subtree embedding vector for each word based on the word embedding vectors and the subtree embedding vectors of its directly depending words within the subtree, starting with the leaf nodes of the subtree towards the root node which represents the word of the COW. In this way, the complete semantic information of the subtree is encapsulated in a final subtree embedding vector of the root node.

In some advantageous embodiments, variants, or refinements of embodiments, a transformation matrix is selected and used in the recursive or recurring neural network for generating a subtree embedding vector for a first word based on a directly depending second word is dependent on a type of relationship between the first word and the second word according to the first DPT or according to the second DPT, respectively. The respective dependency parse tree which comprises each word also comprises information about the relation between its words which can thus be advantageously exploited.

In some advantageous embodiments, variants, or refinements of embodiments, the representation vector for each word of a subtree is generated as a concatenation of a word embedding vector for said word and a subtree embedding vector for said word.

In some advantageous embodiments, variants, or refinements of embodiments, the subtree embedding vector for all leaf nodes is set to a predetermined leaf node representation vector $c_{LEAF}$.

In some advantageous embodiments, variants, or refinements of embodiments, the recurrent neural network for classifying the semantic relationship between the first entity and the second entity is a bidirectional recurrent neural network.

In some advantageous embodiments, variants, or refinements of embodiments, the word embedding vectors of the words are taken from a pre-developed or pre-trained list of word embedding vectors. For example, the word embedding vectors may be taken from GloVe (Pennington et al., "Global vectors for word representation", Proceedings of the 2014 conference on empirical methods in natural language processing, EMNLP, 1532-1543, 2014) or from Moen et al., "Distributional semantics resources for biomedical text processing", 2013.

Further advantageous embodiments, variants, options and modifications are apparent from the dependent claims for each of the aspects of the embodiments of the invention as well as from the description in combination with the figures.

The embodiment of the invention also provides, according to a second aspect, an apparatus configured to perform the method according to any embodiment of the first aspect of the present invention. The apparatus may in particular comprise an input interface, a computing device and an output interface.

The computing device may be realized in hardware, such as a circuit or a printed circuit board and/or comprising transistors, logic gates and other circuitry. Additionally, the computing device may be at least partially realized in terms of software. Accordingly, the computing device may comprise, or be operatively coupled to, a processor (one or more CPUs and/or one or more GPUs and/or one or more ASICs and/or one or more FPGAs), a working memory and a non-transitory memory storing a software or a firmware that is executed by the processor to perform the functions of the computing device. Signals may be received by the input interface and signals that the processor of the computing device creates may be outputted by the output interface. The computing device may be implemented, at least partially, as a microcontroller, an ASIC, an FPGA and so on.

The embodiment of the invention further provides, according to a third aspect, a non-transitory computer-readable data storage medium comprising executable program code configured to, when executed by a computing device, perform the method according to any embodiment of the first aspect.

The embodiment of the invention also provides, according to a fourth aspect, a computer program product (non-transitory computer readable storage medium having instructions, which when executed by a processor, perform actions), comprising executable program code configured to, when executed by a computing device, perform the method according to any embodiment of the first aspect.

The embodiment of the invention also provides, according to a fifth aspect, a data stream comprising, or configured to generate, executable program code configured to, when executed by a computing device, perform the method according to any embodiment of the first aspect.

According to a seventh aspect, the embodiments of the invention provides a method for training a recurrent neural network for use in the method according to any embodiment of the first aspect of the present invention and/or for training a recursive neural network for use in the method according to any embodiment of the first aspect of the present invention.

BRIEF DESCRIPTION

The embodiments of the invention will be explained in yet greater detail with reference to exemplary embodiments depicted in the drawings as appended.

The accompanying drawings are included to provide a further understanding of the present embodiments of the invention and are incorporated in and constitute a part of the specification. The drawings illustrate the embodiments of the present invention and together with the description serve to illustrate the principles of the invention. Other embodiments of the present invention and many of the intended advantages of the present invention will be readily appreciated as they become better understood by reference to the following detailed description. Like reference numerals designate corresponding similar parts.

The numbering of method steps is intended to facilitate understanding and should not be construed, unless explicitly stated otherwise, or implicitly clear, to mean that the designated steps have to be performed according to the numbering of their reference signs. In particular, several or even all of the method steps may be performed simultaneously, in an overlapping way or sequentially.

FIG. 1 shows a schematic flow diagram illustrating a computer-implemented method according to the first aspect of the present embodiment of the invention;

FIG. 2, FIG. 3 and FIG. 4 schematically illustrate further details of the method according to FIG. 1;

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
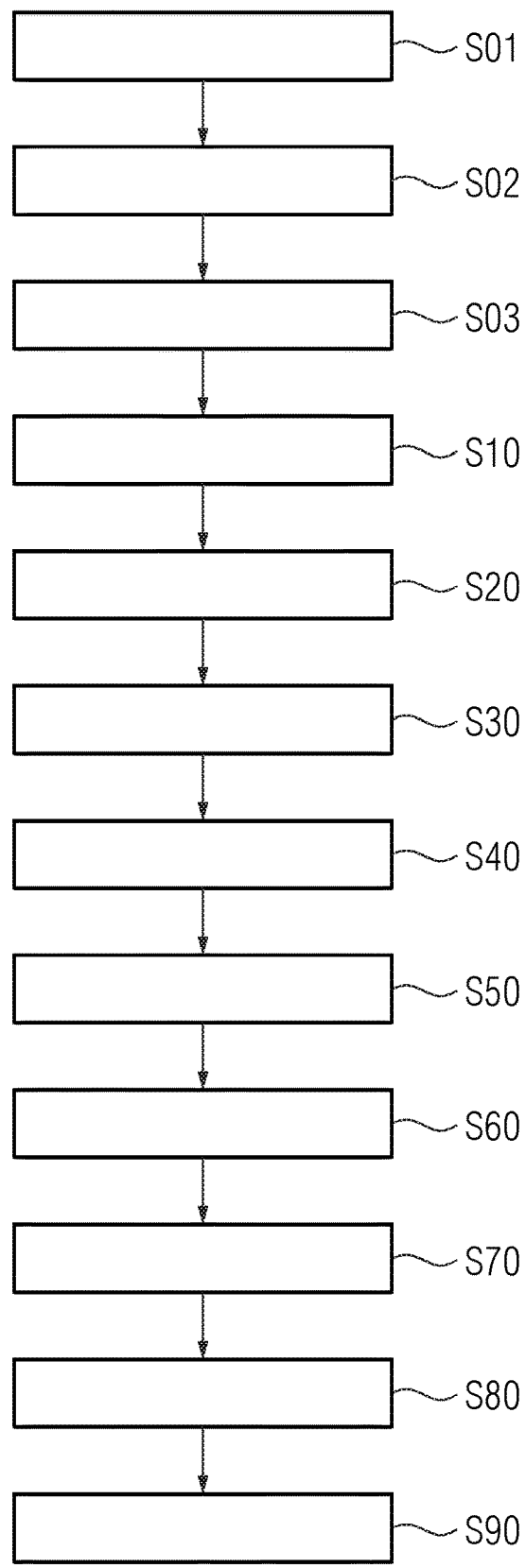

FIG. 1 shows a schematic flow diagram illustrating a computer-implemented method according to the first aspect of the present embodiment of the invention, i.e. a computer-implemented method for inter-sententially determining a semantic relationship between a first entity and a second entity in a natural language document. The method may evidently also be configured for intra-sententially determining said semantic relationship in addition. In the following, for the most part the more difficult case of the inter-sententional relationship extraction will be explained. The method will be described using the English language for examples. However, it will be evident that the same method may be applied to any other language as well, for example to Chinese, Hindustani, Spanish, Arabic, Malay, Russian, Bengali, Portuguese, French, German, Japanese, and so on.

In a step S01, a natural language document is provided, for example uploaded into a memory, or retrieved from a database or the like.

In a step S02, a pair of entities, consisting of a first entity and a second entity, is provided, the relationship between which is desired to be known. This may be done, for example, by a user sending a query to a system, indicating the two entities.

In a step S03 a first origin sentence which comprises the first entity and a second origin sentence which comprises the second entity are automatically selected from the natural language document. The first and the second origin sentences may be chosen such that the distance in sentences or the distance in words between the first sentence and the second sentence in the document is the smallest out of any pair of sentences of the document which comprise the first entity and the second entity, respectively.

In a step S10, a first dependency parse tree, DPT, is generated for the first origin sentence of the document which comprises the first entity, wherein each DPT comprises at least a root node. Since sentences in most languages comprise more than one word, usually the DPT will comprise further nodes in addition to the root node. The further nodes may be leaf nodes (i.e. have no nodes dependent from them) or may themselves have nodes dependent from them.

In a step S20, a second dependency parse tree, DPT, is generated for the second origin sentence of the document which comprises the second entity, wherein each DPT comprises at least a root node, but usually also additional nodes.

The dependency parse trees, DPT, may be generated by parsing sentences as described e.g. in Chen et al. and then by arranging the parsed sentences in DPTs by using e.g. NetworkX (see Hagberg et al.). Each token (word) is realized as a node of the tree, and the dependency relation is realized as a link between the nodes.

Nodes that do not have any dependent nodes are sometimes also designated as "leaf nodes". The root node is dependent from no other node. If a word does not have a subtree (or, expressed in another way, if the word is identical to its subtree, i.e. a subtree of one single word), then said word is both a root node and a leaf node.

In the following, an example with two sentences in a document in the English language will be used for illustration of the method. Assume that a natural language text document comprises the following two sentences in the English language, wherein for the further purpose the words in these two sentences have been numbered from Y1 to Z14:

TABLE 1 first origin sentence (Sentence #1)

| Paul | Allen | started | a | company | and | named | Vern | Raburn | its | President. |
|------|-------|---------|---|---------|-----|-------|------|--------|-----|------------|
| Y1 | Y2 | Y3 | Y4 | Y5 | Y6 | Y7 | Y8 | Y9 e1 | Y10 | Y11 |

TABLE 2 second origin sentence (Sentence #2)

| The | company | to | be | called | Paul | Allen | Group | will | be | based | in | Bellevue, | Washington |
|-----|---------|----|----|--------|------|-------|-------|------|-----|-------|-----|-----------|------------|
| Z1 | Z2 | Z3 | Z4 | Z5 | Z6 | Z7 e2 | Z8 | Z9 | Z10 | Z11 | Z12 | Z13 | Z14 |

Assume further that it is desired to know the relationship between, as a first entity e1, the name "Vern Raburn", and, as a second entity e2, the company "Paul Allen Group".

To a human reader it is a simple task to infer, from reading the two sentences above, that the two entities e1, e2 are connected in the relationship "Person-Organisation" (or: Per-Org for short). However, to a natural language processing, NLP, system this task is more difficult, as the first entity e1, "Vern Raburn", is comprised in a first origin sentence (Sentence #1) and the second entity e2, "Paul Allen Group", is comprised in a second origin sentence (Sentence #2) of a natural language text document.

Figure 2:
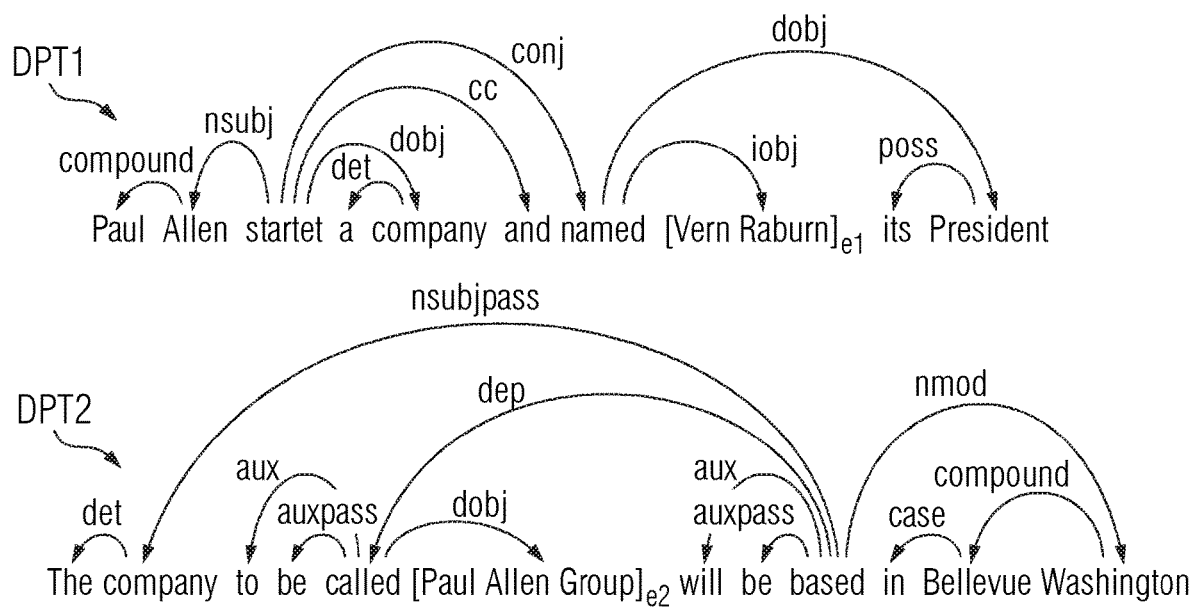

FIG. 2 shows in its upper half a dependency parse tree DPT1 for the first origin sentence, and in its lower half a dependency parse tree DPT2 for the second origin sentence. In the first origin sentence, "started" has been determined to be the root node, whereas in the second origin sentence "based" has been determined to be the root node. The symbols accompanying the arrows in FIG. 2 denote the semantic and grammatical relationship between the words (or nodes) in the English language. For example, the symbol "compound" between words Y1 ("Paul") and Y2 ("Allen") indicates that these two words Y1 and Y2 form a compound noun, and the symbol "nsubj" indicates that the compound "Paul Allen" (i.e. entity e1, or Y1+Y2) is the subject for the word Y3 ("started") which is the predicate of the first origin sentence.

The symbols in FIG. 2 have been taken from the Universal Dependencies (UD) framework, version 2.

In a step S30, the root nodes Y3 of the first DPT and the root node Z11 of the second DPT are linked, preferably by NEXTS, so as to create a chain of words, COW, from (and including) the first entity e1 to (and including) the second entity e2. Table 3 shows that chain of words, COW, which may also be designated as, or interpreted as indicating, the shortest dependency path, SDP:

TABLE 3

Chain of words, COW, of the shortest dependency path, SDP

| Vern | Raburn | named | started | based | called | Group | Paul | Allen |
|------|--------|-------|---------|-------|--------|-------|------|-------|
| Y8 | Y9 e1 | Y7 | Y3 | Z11 | Z5 | Z8 | Z6 e2 | Z7 |

In a step S40, for each word in the COW (or, in other words, in the SDP), a subtree comprising the word itself as well as, if applicable, all words depending as nodes from said words as a root, is determined (or generated). Thus, the COW or SDP is made into an inter-sentential Dependency Path, iSDP.

Figure 3:
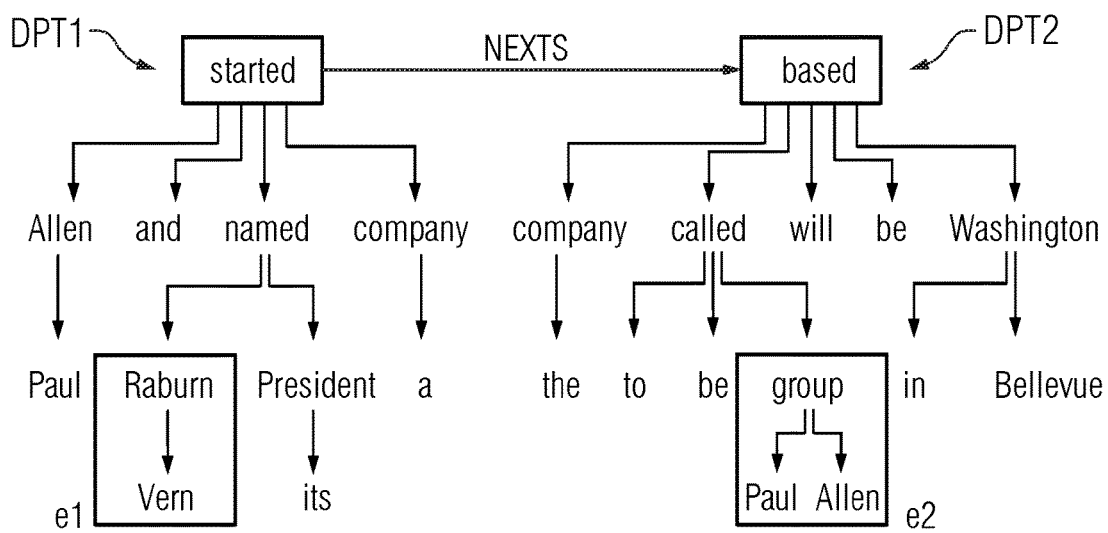

FIG. 3 schematically illustrates this iDSP, wherein the SDP has been highlighted.

In a step S50, for each word in the COW (or in the SDP), a subtree embedding vector $c_w$ is generated which, in case the word in the COW has a subtree, is based at least on word embeddings of the words of the subtree. If the word in the COW does not have a subtree (i.e. if it is a leaf node as well as a root node of its own subtree), then—as for any leaf nodes—its subtree embedding vector $c_w$ is set to a predefined leaf node subtree embedding vector $c_{LEAF}$. In a step S60, for each word in the COW a representation vector $p_w$ is generated, wherein the representation vector $p_w$ for each word comprises a word embedding vector $x_w$ for said word itself as well as its subtree embedding vector $c_w$. Preferably, the representation vector $p_w$ comprises, or consists of, a concatenation of the word embedding vector $x_w$ and the subtree embedding vector $c_w$.

The word embedding vectors $x_w$ are preferably taken from a pre-trained word embeddings database suitable for the type of natural language document. For example, for general text documents, GloVe (see Penington et al.) may be used and for biomedical natural language text documents the word embeddings database from Moen et al. may be used.

Figure 4:
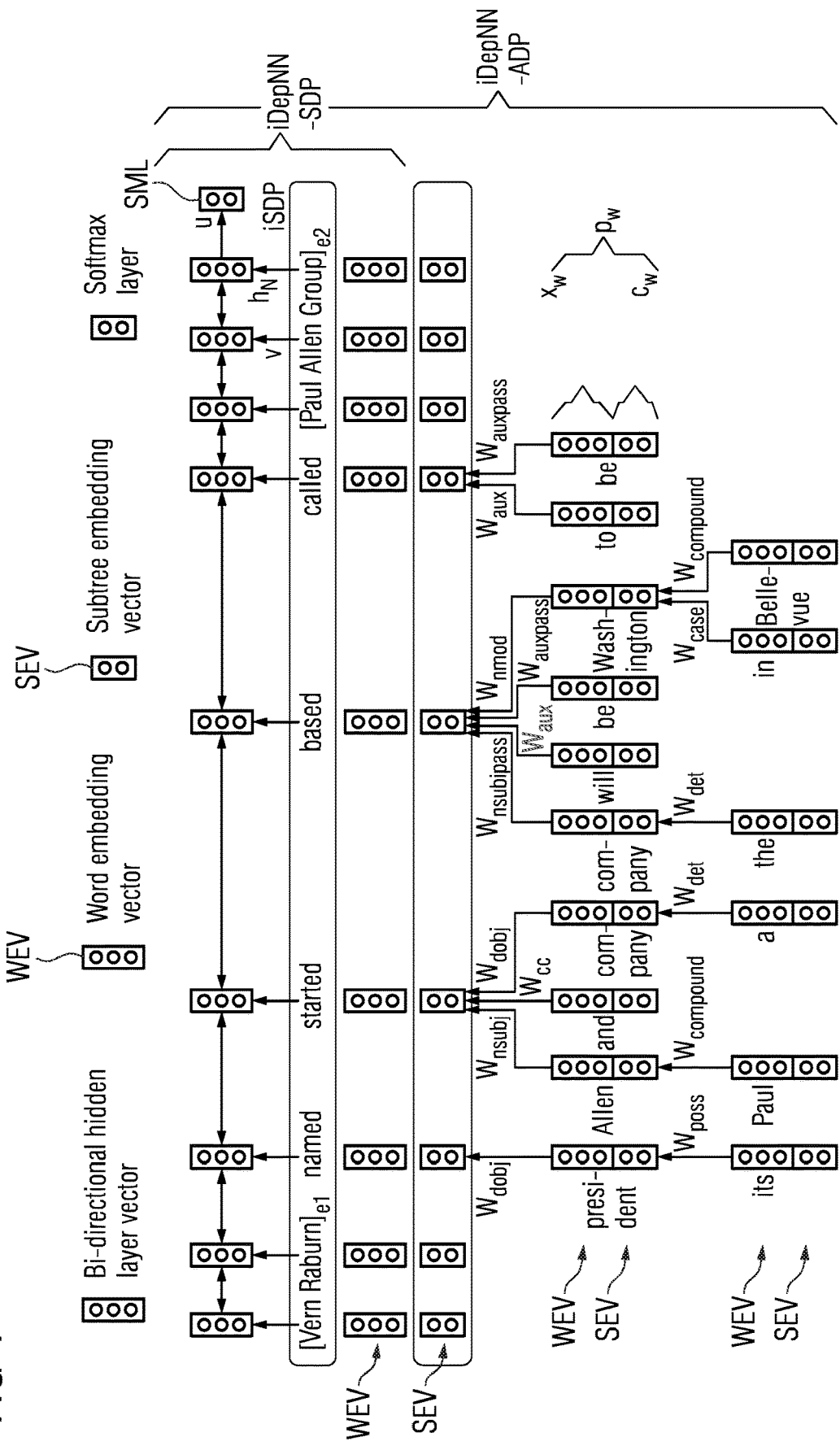

FIG. 4 schematically illustrates some steps of the computer-implemented method according to FIG. 1.

In the line of FIG. 4 second from the top, the COW (or SDP) is shown. Below that, the representation vectors $p_w$ for each word Y8, Y9, Y7, Y3, Z11, Z5, Z8, Z6 and Z7 in the COW are shown. Each representation vector $p_w \in R^{d+d'}$ comprises a word embedding vector WEV $x_w \in R^d$ for the word of the COW itself and a subtree embedding vector SEV $c_w \in R^{d'}$ for the subtree of each word of the COW. Herein, d is the dimension of the word embedding vectors WEV, determined by their source database, and d' is the dimension of the subtree embedding vector SEV which is a hyperparameter.

For words in the COW which do not have a subtree (or, in the other interpretation, which are root nodes as well as leaf nodes of their own subtree), $c_w = c_{LEAF}$. In the present example, this applies to the words Y8, Y9, Z8, Z6 and Z7. For instance, the representation vector $p_{Y8}$ for the word Y8 ("Vern") would be $[x_{Y8}, c_{LEAF}]$ wherein [,] represents concatenation, and $x_{Y8}$ the word embedding vector WEV for "Vern".

For the other words which do have subtrees (Y7, Y3, Z11, Z5), in step S50 the subtree embedding vectors SEV $c_w$ are generated by recursive transformations of the representation vectors $p_w$ of its children words, preferably as follows:

A recursive artificial neural network, RecNN, is used to construct the subtree embedding vectors SEV $c_w$, traversing bottom up from the leaf nodes of the subtree to the root node of the subtree. The individual dependency between each word w and each of its children words (designated as "children(w)") is given by a dependency relation $r = R_{(w,q)}$ based on the dependency parse, for example $r = R_{(w,q)} = $dobj when w and q have the "dobj" relation according to Universal Dependencies, UD. For each r, a transformation matrix $W_r \in R^{d' \times (d+d')}$ is learned during training.

Thus, the subtree embedding vectors SEV $c_w$ may be computed as:

$$c_w = f(\Sigma_{q \in children(w)} W_{R_{(w,q)}} \cdot p_q + b), \quad (1)$$

with an activation function $f$, with a learnable bias $b \in R^{d'}$ and with the representation vector $p_q$ for the children q of word w given by the concatenation $p_q = [w_q, c_q]$, and wherein $c_q$ is either $c_{LEAF}$, or calculated again according to the formula (1) above.

For example, for the word Y7 ("named") in the COW or SDP, first for the word Y10 ("its") $c_{Y10}$ would be determined to be $c_{LEAF}$. Then, a word embedding vector WEV $x_{Y10}$ from a word embeddings database (e.g. GloVe) would be retrieved and concatenated with $c_{Y10}$ to form $p_{Y10} = [x_{Y10}, c_{LEAF}]$.

Then, for the word Y11 ("President"), a word embedding vector WEV $x_{Y11}$ would be retrieved, for the word "president". The subtree embedding vector SEV $c_{Y11}$ would be calculated using formula (1) based on $p_{Y10}$ and using the trained transformation matrix $W_{poss}$, as the dependency between word Y11 "President" and word Y10 "its" in the first origin sentence is "poss" according to the Universal Dependencies, LTD, framework. The subtree embedding vector SEV $p_{Y11}$ would then be provided as $p_{Y11} = [x_{Y11}, c_{Y11}]$.

Then, for the word Y7 ("named"), a word embedding vector WEV $x_{Y7}$ would be retrieved, for the word "named". The subtree embedding vector SEV $c_{Y7}$ would be calculated using formula (1) based on $p_{Y11}$ and using the trained transformation matrix $W_{dobj}$, as the dependency between word Y7 "named" and word Y11 "President" in the first origin sentence is "dobj" according to the Universal Dependencies, UD, framework.

Since formula (1) uses a sum over all children q of $word_w$, branches such as the word Y3 ("started") having three children—words Y2, Y5 and Y6—can be easily resolved, wherein again for each child a different trained weight matrix $W_{R(w,q)}$ may be applied according to the dependency R(w,q) between the child, q, and word, w, Y3 ("started"). For example, as illustrated in FIG. 4, the weight matrices $W_{nsubj}$, $W_{cc}$ and $W_{dobj}$ are used for calculating $c_{Y3}$ and thus $p_{Y3}$.

In the described way, each word in the COW is enriched with additional information about how this word functions in a specific sentence to form a more precise structure for classifying relationships within and across sentences. For inter-sentential relationship extraction this is especially beneficial, as the COW is by definition composed from parts of two different origin sentences which will make its meaning more cryptic. The dependency subtrees, each of which stems exclusively from a single one of the origin sentences, thus help to provide useful additional information.

In a step S70, the representation vectors $p_w$ for the words w in the COW are input into a recurrent artificial neural network, in particular into a bi-directional artificial neural network biRNN. The layers of this biRNN are shown in the first row of FIG. 4, wherein the bi-directionality is indicated by bi-directional arrows between the bi-directional hidden layer vectors, wherein each layer receives as further input also a representation vector $p_w$ of a word of the COW.

In a step S80, using the biRNN, the semantic relationship between the first entity e1 and the second entity e2 is classified, based on the input representation vectors $p_w$. For example, as illustrated in FIG. 4, a final softmax layer SML may be used to indicate probabilities that the relationship between the first entity e1 and the second entity e2 is of a specific type.

In a step S90, an output signal indicating the semantic relationship between the first entity e1 and the second entity e2 may be output, e.g. in form of an electronic signal, as a control signal for a display device for displaying the semantic relationship visually, as a control signal for an audio device for indicating the determined semantic relationship as audio and/or the like.

In some variants, the method may first be applied with a first trained biRNN to determine whether or not the first and second entities e1, e2 have any of the pre-specified relationship types or not such that the output may be a single number indicating the likelihood that this is the case. Then, the method may be applied a second time with a differently trained second biRNN to determine which of the pre-specified relations exists between the first and second entities e1, e2.

For example, for the MUC6 (Grisham and Sundheim, 1996) dataset, which contains information about management succession events from newswire, three types of relations may be pre-specified:

Person-Organisation (Per-Org);
Person-Position (Per-Post); and
Position-Organisation (Post-Org).

Evidently, for other types of natural language documents or datasets, other pre-specified relation types may be suitable, such as content-container, cause-effect, instrument-agency, "works for", "is related by blood to", "owes money to" and so on.

Training data for the MUC6 dataset can be provided e.g. by tagging entities "Person" (Per), "Organization" (Org) using Stanford NER tagger (see e.g. Finkel et al., "Incorporating non-local information into information extraction systems by gibbs sampling", Proceedings of the 48th Annual Meeting of the Association for Computational Linguistics, 363-370, Association for Computational Linguistics, 2005). The entity type "Position" (Post) can be annotated based on the templates. MUC6 is the standard annotated dataset, provided by LDC. However, there are missing annotations for relationships spanning sentence boundaries. Therefore, on top of the available intra-sentential relation annotations inter-sentence relation annotations can be performed in addition.

As is also sketched in FIG. 4, the biRNNs receiving a shortest dependency path COW for inter-sentential relation extraction may be designated as "Inter-sentential Dependency-Based Neural Networks", iDepNN-SDP, whereas the complete structure may be designated as the "Inter-sentential Augmented Dependency Path" method, iDepNN-ADP method.

The output of the softmax layer SML may be a probability distribution y over L relation labels, as y=softmax(U·$h_N$+$b_y$), where U∈$R^{L×H}$ is the weight matrix connecting a hidden vector of dimension H to an output of dimension L, $b_y$∈$R^L$ is a bias parameter, and $h_N$ is the last hidden vector of the biRNN. In the example of FIG. 4, the first hidden vector $h_1$ (or: $h_{Y8}$) receives the representation vector $p_{Y8}$ of word Y8 ("Vern") and the last hidden vector $h_N$ (or $h_9$, since N=9 because the COW consists of 9 words, or $h_{Z8}$) receives the representation vector $p_{Z8}$ of word Z8 ("Group").

To compute the hidden representations hw for each word, in particular a Connectionist biRNN may be used (see Vu et al., which is incorporated herein by reference), which combines the forward and backward pass by adding their hidden layers ($h_{f_t}$ for the forward direction and $h_{b_t}$ for the backward direction) at each time step t and also adds a weighted connection to the previous combined hidden layer $h_{t-1}$ to include all intermediate hidden layers into the final decision:

$$h_{f_t} = f(V \cdot i_t + W \cdot h_{f_{t-1}}) \quad (2)$$

$$h_{b_t} = f(V \cdot i_{N-t+1} + W \cdot h_{b_{t+1}}) \quad (3)$$

$$h_t = f(h_{f_t} + h_{b_t} + W \cdot h_{t-1}), \quad (4)$$

wherein V∈$R^{H×|i|}$, N is the total number of words in the COW or SDP and $i_t$ is the input vector at time t, defined by:

iDepNN-SDP: it=[$x_t$,$L_t$]

iDepNN-ADP: it=[$p_t$,$L_t$], wherein $L_t$ are lexical level features (e.g., part-of-speech tags, position indicators, entity types) for each wort w at time point t. In order to minimize the parameters, advantageously the same weight matrix W may be used in all three of the formulae (2)-(4) above, i.e. during the forward pass in formula (2), during the backward pass in formula (3) and during the combination in formula (4). The parameters of the matrix W are learned using backpropagation. Issues with loopy backpropagation as may be present in other approaches are avoided with the present method.

For training, negative samples may be generated by randomly sampling co-occurring entities without known interactions. Then the same number may be sampled as positives to obtain a balanced dataset during training and validation for different sentence ranges. The train/dev/test split may e.g. be 60/20/20 as is common.

Figure 5:
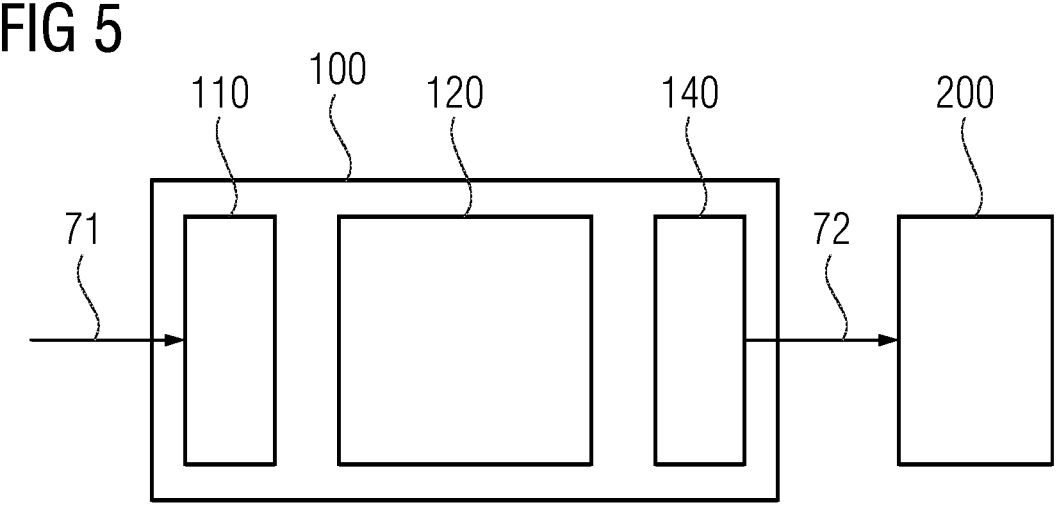
FIG. 5 shows a block diagram schematically illustrating an apparatus according to an embodiment of the second aspect of the present invention.

FIG. 5 shows an apparatus 100 according to an embodiment of the second aspect of the present invention, i.e. an apparatus for inter-sententially determining a semantic relationship between a first entity and a second entity in a natural language document. In particular, the apparatus 100 is configured to perform the method according to any embodiment of the first aspect of the present invention, in particular the method as described in the foregoing with respect to FIG. 1 through FIG. 4.

The apparatus 100 comprises an input interface 110 for receiving an input signal 71 such as a natural language document and a pair of entities e1, e2, wherein the task is to determine the semantic relationship between e1 and e2. The input interface 100 may be realized in hard- and/or software and may utilize wireless or wire-bound communication. For example, the input interface 110 may comprise an Ethernet adapter, an antenna, a glass fiber cable, a radio transceiver and/or the like. The input interface 110 may in particular be used to perform the steps S01 and S02 as they have been described in the foregoing.

The apparatus 100 further comprises a computing device 120 configured to perform the steps S03 and S10 through S80. The computing device 120 may in particular comprise one or more central processing units, CPUs, one or more graphics processing units, GPUs, one or more field-programmable gate arrays FPGAs, one or more application-specific integrated circuits, ASICs, and or the like for executing program code. The computing device 120 may also comprise a non-transitory data storage unit for storing program code and/or inputs and/or outputs as well as a working memory, e.g. RAM, and interfaces between its different components and modules.

The apparatus may further comprise an output interface 140 configured to output an output signal 72, for example as has been described with respect to step S90 in the foregoing. The output signal 72 may have the form of an electronic signal, as a control signal for a display device 200 for displaying the semantic relationship visually, as a control signal for an audio device for indicating the determined semantic relationship as audio and/or the like. Such a display device 200, audio device or any other output device may also be integrated into the apparatus 100 itself.

Figure 6:
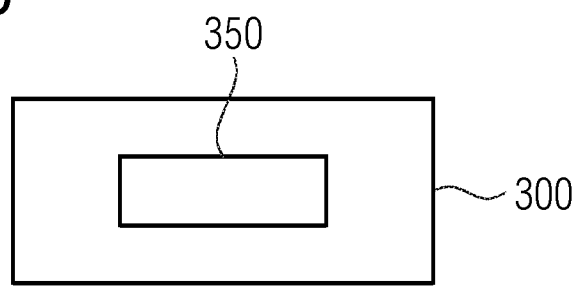
FIG. 6 shows a block diagram schematically illustrating a computer program product according to an embodiment of the third aspect of the present invention.

FIG. 6 shows a schematic block diagram illustrating a computer program product 300 according to the third aspect of the present embodiment of the invention, i.e. a computer program product 300 comprising executable program code 350 configured to, when executed (e.g. by the apparatus 100), perform the method according to the first aspect of the present embodiment, in particular the method as has been described with respect to FIG. 1 through FIG. 4 in the foregoing.

Figure 7:
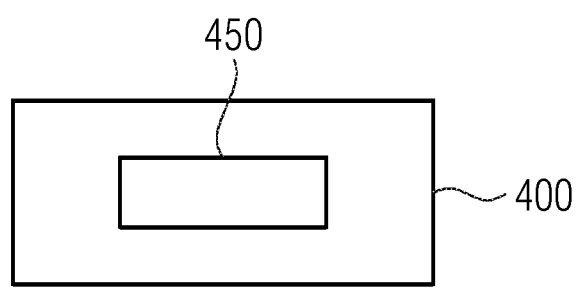
FIG. 7 shows a block diagram schematically illustrating a data storage medium according to an embodiment of the fourth aspect of the present invention.

FIG. 7 shows a schematic block diagram illustrating non-transitory computer-readable data storage medium 400 according to the fourth aspect of the present embodiment, i.e. a data storage medium 400 comprising executable program code 450 configured to, when executed (e.g. by the apparatus 100), perform the method according to the first aspect of the present embodiment, in particular the method as has been described with respect to FIG. 1 through FIG. 4 in the foregoing.

In the foregoing detailed description, various features are grouped together in the examples with the purpose of streamlining the disclosure. It is to be understood that the above description is intended to be illustrative and not restrictive. It is intended to cover all alternatives, modifications and equivalence. Many other examples will be apparent to one skilled in the art upon reviewing the above specification, taking into account the various variations, modifications and options as described or suggested in the foregoing.

The invention claimed is:

1. A computer-implemented method for inter-sententially determining a semantic relationship between a first entity and a second entity in a natural language document, comprising at least the steps of:
   generating a first dependency parse tree, DPT, for a first origin sentence of the document which comprises the first entity, wherein each DPT comprises at least a root node;

generating a second DPT for a second origin sentence of the document which mentions the second entity;

linking the root nodes of the first DPT and the second DPT so as to create a chain of words, COW, from the first entity to the second entity;

determining for each word in the COW a subtree comprising the word itself as well as, if applicable, all words depending as nodes from said words as a root;

generating for each word in the COW a subtree embedding vector $c_w$ which, in case the word in the COW has a subtree, is based at least on word embedding vectors $x_w$ of the words of the subtree;

generating a representation vector $p_w$ for each word in the COW, wherein the representation vector $p_w$ for each word comprises a word embedding vector $x_w$ for said word itself as well as its subtree embedding vector $c_w$;

inputting the representation vectors $p_w$ for each word in the COW into a recurrent neural network; and classifying, using the recurrent neural network, the semantic relationship between the first entity and the second entity, based on the input representation vectors $p_w$.

2. The method of claim 1, wherein the root nodes of the first DPT of the first origin sentence and of the second DPT (of the second origin sentence are linked directly.

3. The method of claim 1, comprising selecting the first origin sentence and the second origin sentence from the sentences in the document such that the distance in sentences or the distance in words between the first origin sentence and the second origin sentence in the document is the smallest out of any pair of sentences of the document which comprise the first entity and the second entity, respectively.

4. The method of claim 1, comprising selecting the first origin sentence and the second origin sentence from the sentences in the document such that the distance in sentences or the distance in words between the first origin sentence and the second origin sentence within the COW is the smallest out of any pair of sentences of the document which comprise the first entity and the second entity, respectively.

5. The method of claim 1, wherein generating the subtree embedding vector $c_w$ for any word of the COW comprises, for each word of its subtree, recurrently applying a recursive neural network to generate a subtree embedding vector $c_w$ for each word based on the word embedding vectors $x_w$ and the subtree embedding vectors $c_w$ of its directly depending words within the subtree, starting with the leaf nodes of the subtree towards the root node which represents the word of the COW.

6. The method of claim 5, wherein a transformation matrix W selected and used in the recursive neural network for generating a subtree embedding vector $c_w$ for a first word based on a directly depending second word is dependent on a type of relationship between the first word and the second word according to the first DPT or according to second DPT.

7. The method of claim 5, wherein the representation vector $p_w$ for each word of a subtree is a generated as a concatenation of a word embedding vector $x_w$ for said word and a subtree embedding vector $c_w$ for said word.

8. The method of claim 5, wherein the subtree embedding vector $c_w$ for all leaf nodes is set to a predetermined leaf node representation vector $c_{LEAF}$.

9. The method of claim 1, wherein the recurrent neural network for classifying the semantic relationship between the first entity and the second entity is a bidirectional recurrent neural network.

10. The method of claim 1, wherein the word embedding vectors $x_w$ of the words are taken from a pre-developed list of word embedding vectors.

11. A method for training a recurrent neural network for use in the method according to claim 1.

12. A method for training a recursive neural network for use in the method according to claim 5.

13. An apparatus configured to perform the method according to claim 1.

14. A computer program product, comprising a non-transitory computer readable hardware storage device having computer readable program code stored therein, said program code executable by a processor of a computer system to implement a method comprising executable program code configured to, when executed, perform the method according to claim 1.

15. A non-transitory computer-readable data storage medium comprising executable program code configured to, when executed, perform the method according to claim 1.

* * * * *